United States Patent Office 2,929,796
Patented Mar. 22, 1960

2,929,796

HYDROXY-SUBSTITUTED PHENYLENEDIAMINES AND THEIR USE IN RUBBER

Joseph C. Ambelang, Akron, Ohio, assignor to The Firestone Tire & Rubber Company, Akron, Ohio, a corporation of Ohio No Drawing. Application October 15, 1954
Serial No. 462,625

4 Claims. (Cl. 260—45.9)

This invention relates to new chemical compounds and their use as inhibitors of the deteriorating action of ozone on vaulcanized rubber compositions.

The rubber compositions can be those used in tires, inner tubes, rubber thread and other products produced from rubber latexes, and other rubber articles. The compositions consist essentially of hydrocarbon-diene rubber, such as natural rubber or a synthetic rubber, e.g., polymer of butadiene or an alkyl derivative thereof, or copolymer of butadiene or an alkyl derivative thereof with a vinyl comonomer, or a mixture of such rubbers.

The deterioration of rubber is due to various factors and is evidenced in various ways. The inhibitors of this invention prevent or retard such deterioration. They are the ortho and para phenylenediamines having the formula $$R_1R_2N.C_6H_4.NHR_3$$

in which $R_1$ and $R_3$ are each from the class consisting of alkyl, cycloalkyl, alkylcycloalkyl, hydroxyalkyl, and hydroxycycloalkyl groups containing 1 to 20 carbon atoms, at least one hydroxy group being present in the molecule; and $R_2$ is from the class consisting of hydrogen and alkyl and cycloalkyl groups containing 1 to 20 carbon atoms, with the proviso that when $R_1$ and $R_2$ are joined as an alkylene group the alkylene group contains 2 to 10 carbon atoms.

Representative compounds are
N,N-dimethyl-N'-hydroxymethyl-p-phenylenediamine
N,N-dimethyl-N'-hydroxyhexyl-p-phenylenediamine
N,N-di-i-butyl-N'-hydroxy-i-propyl-p-phenylenediamine
N,N-di-n-butyl-N'-hydroxyhexyl-p-phenylenediamine
N,N-di-n-butyl-N'-hydroxyundecyl-p-phenylenediamine
N,N-di-n-butyl-N'-hydroxyeicosyl-p-phenylenediamine
N,N-di-i-propyl-N'-hydroxy-i-propyl-o-phenylenediamine
N,N-di-n-butyl-N'-hydroxyoctyl-p-phenylenediamine
N,N-di-tt-octyl-N'-hydroxy-n-butyl-o-phenylenediamine
N-butyl-N'-(1-methyl - 2 - hydroxypropyl)-p-phenylenediamine
N-methyl - N - hydroxyethyl-N'-sec-butyl-p-phenylenediamine
N,N-cyclopentamethylene-N'-i-propyl - p - phenylenediamine
N-cylclohexyl-N'-(1 - hydroxy-1,3-dimethylbutyl)-p-phenylenediamine
N,N-dicyclohexyl-N'-hydroxymethyl-o-phenylenediamine

N,N-DIMETHYL-N'-HYDROXYHEXYL-p-PHENYLENEDIAMINE

One-tenth mole (13.6 g.) of p-aminodimethylaniline was dissolved in 150 ml. of ethanol with 10 ml. of glacial acetic acid and 0.2 mole (23.2 g.) of 4-hydroxy-4-methyl-2-pentanone. One-tenth of a gram of Adams platinum oxide was added and the mixture shaken under 3 atmospheres pressure of hydrogen until 0.1 mole of hydrogen had been absorbed. The solution was decanted off the catalyst and the solvent distilled off on the steam bath. The residue was poured into water and neutralized with sodium bicarbonate. The solid product was filtered off and air dried. Yield was quantitative. The product recrystallized from a hexane-heptane mixture had a melting point of 87–88° C.

Analysis.—Calc. for $C_{14}H_{24}ON_2$: N, 11.86. Found: N (Kjeldahl), 11.89, 11.96.

N,N'-DI(HYDROXYHEXYL)-p-PHENYLENEDIAMINE

One-tenth mole (10.8 g.) of p-phenylenediamine was alkylated with 0.4 mole of 4-hydroxy-4-methyl-2-pentanone in 150 ml. of ethanol and 10 ml. of glacial acetic acid over 0.1 g. of Adams platinum oxide under 3 atmospheres pressure of hydrogen. When 0.2 mole of hydrogen had been absorbed in 2½ hours, the solution was decanted and concentrated on the steam bath. The residue was shaken with benzene and neutralized with sodium bicarbonate. The solid product filtered off weighed 19 g. It was recrystallized from a benzene-toluene mixture.

Analysis.—Calc. for $C_{18}H_{32}O_2N_2$: N, 9.08. Found: N (Kjeldahl), 9.16, 9.14.

N-HYDROHYHEXYL-N'-ETHYL-o-PHENYLENEDIAMINE

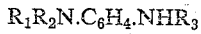

One-tenth mole (13.6 g.) of o-ethylaminoaniline was dissolved in 150 ml. of ethanol with 10 ml. of glacial acetic acid and 0.2 mole (23.2 g.) of 4-hydroxy-4-methyl-2-pentanone. One-tenth of a gram of Adams platinum oxide was added and the mixture shaken under 3 atmospheres pressure of hydrogen until one-tenth mole of hydrogen had been adsorbed. The solution was decanted off the catalyst and evaporated on the steam bath in vacuo. The residue was mixed with water, and extracted with ether. The extract was washed with sodium bicarbonate solution before drying over sodium sulfate and distilling off the solvent in vacuo. The yield was a viscous oil weighing 91% of the theory.

Analysis.—Calc. for $C_{14}H_{24}ON_2$: N, 11.86. Found: N (Kjeldahl), 11.94; 12.00.

Oxygen and ozone both have a harmful effect on rubber, but the effect of each is different, and compounds which inhibit or prevent the harmful effect of one are not necessarily effective in stopping or retarding the harmful effect of the other.

Crabtree and Kemp in an article in Industrial and Engineering Chemistry, vol. 38, starting at page 278 (1946) explain the difference in the action of oxygen and ozone. The light-catalyzed oxidation which occurs during outdoor exposure forms a skin and crazed appearance over the exposed surface of the rubber. Ozone, even in very low concentration, induces cracking in rubber, but only if the rubber is stretched. (C. H. Leigh-Dugmore, Rubber Age and Synthetics, November and December, 1952.) The cracks are perpendicular to the direction of stretch. Such cracking can occur in the absence of light.

Tires are stressed when inflated. While a tire is at rest it is stretched statically, and on a moving vehicle it is stretched dynamically, i.e., it undergoes alternating stretching and relaxing. Some of the antiozone agents are more effective in static tests and others are more effective in dynamic tests. Antiozone agents effective under both conditions will be desired for tires, but for other rubber products an antiozone agent which does not meet both tests may be used.

The inhibiting effect of the antiozone agents of this invention in rubber was determined by treatment of unaged, cured stocks with air of controlled ozone content in specially designed equipment, and also by outdoor exposure to natural weathering. The tests were conducted with one-half inch dumbbell samples of approximately 100 gauge thickness. The special apparatus for testing with air of controlled ozone content, and the method of testing therein are described in the articles by Ford and Cooper, appearing in India Rubber World for September and October 1951, entitled "A Study of the Factors Affecting the Weathering of Rubber-Like Materials—I and II." The following reports refer to tests in which the ozone concentration was maintained at 60 parts per 100,000,000 for 7 hours at 95° F. Two types of tests were conducted. In one type, called the dynamic test, the sample was repeatedly stretched between the limits of 0 and 20 percent elongation at the rate of 108 cycles per minute. In the other type of test, the static test, the samples were stretched at 12.5 percent elongation throughout the test. In the last of the following tables the test reported was both static and dynamic. No special lights were used in any of the tests. On completion of each test the number and size of the cracks in each sample were compared visually with the number and size of the cracks in a blank which contained no antiozone agent and which was cured and tested at the same time as the test sample. The number of cracks was reported on an arbitrary scale as follows: "none," "very few," "few," "moderate," "moderate-to-numerous," and "numerous." The size of the cracks was reported according to an arbitrary scale as follows: "very slight," "slight," "moderate," "severe," and "very severe."

The reported results include data on the tensile properties of the cured rubber stocks before and after aging in an oven under the conditions stated in the various examples. The modulus and tensile strength are given in pounds per square inch, and the elongation is reported as percent of stretch at the break. These data are included to show that the antiozone agents have no substantial deleterious effect upon the cure or upon the aging of the cured stocks.

In all of the reported tests 2.0 parts by weight of an antiozone agent were added to the control formula for each 100 parts of rubber present. The following includes tests with GR–S as well as tests with natural rubber. Any substantial amount of the antiozone agent may be employed and this may vary, for example, from 0.2 part by weight to 10 parts by weight, depending upon the use to be made of the rubber composition.

Each of the following reports includes the composition of the test stock in parts by weight; the physical properties before and after aging are then recorded; and the data on ozone cracking follows this.

*Formulae*

| | | |
|---|---|---|
| GR–S | 100 | 100 |
| HMF Black | 45 | 45 |
| Softener | 10 | 10 |
| Zinc oxide | 3 | 3 |
| Sulfur | 2 | 2 |
| Accelerator | 1.3 | 1.3 |
| N,N'-Dihydroxyhexyl-p-phenylenediamine | | 2 |
| Total | 161.3 | 163.3 |

Normal Properties (Cured 60 min. at 280° F.)

| | | |
|---|---|---|
| 300% Modulus | 1,550 | 1,525 |
| Tensile Strength | 1,760 | 1,575 |
| Elongation | 320 | 320 |

Aged 4 Days at 212° F.

| | | |
|---|---|---|
| Tensile Strength | 1,325 | 1,390 |
| Elongation | 140 | 180 |

Ozone Cracking (Artificial Weathering)

| | | |
|---|---|---|
| Static: | | |
| Size | Moderate | Slight. |
| Frequency | Mod. to Num. | Few. |
| Dynamic: | | |
| Size | Slight | V. Slight. |
| Frequency | Numerous | Numerous. |

In the static test both the size and number of ozone cracks were reduced by the addition of N,N'-dihydroxyhexyl-p-phenylenediamine. Under dynamic conditions the size of the cracks was reduced.

*Formulae*

| | | |
|---|---|---|
| GR–S | 100 | 100 |
| HMF Black | 45 | 45 |
| Softener | 10 | 10 |
| Zinc oxide | 3 | 3 |
| Sulfur | 2 | 2 |
| Accelerator | 1.3 | 1.3 |
| N,N-Dibutyl-N'-hydroxyhexyl-p-phenylenediamine | | 2 |
| Total | 161.3 | 163.3 |

Normal Properties (Cured 60 min. at 280° F.)

| | | |
|---|---|---|
| 300% Modulus | 1,450 | 1,325 |
| Tensile Strength | 1,920 | 1,910 |
| Elongation | 380 | 380 |

Aged 4 Days at 212° F.

| | | |
|---|---|---|
| Tensile Strength | 1,625 | 1,675 |
| Elongation | 200 | 220 |

Ozone Cracking (Artificial Weathering)

| | | |
|---|---|---|
| Static: | | |
| Size | Moderate | None. |
| Frequency | Mod. to Num. | |
| Dynamic: | | |
| Size | Slight | V Slight. |
| Frequency | Numerous | Numerous. |

The N,N-dibutyl-N'-hydroxyhexyl-p-phenylenediamine repressed completely the formation of ozone cracks under static conditions and resulted in reduced size of cracks under dynamic conditions.

*Formulae*

| | | | |
|---|---|---|---|
| Smoked Sheet | 100 | 100 | 100 |
| Softener | 4 | 4 | 4 |
| Stearic Acid | 3 | 3 | 3 |
| Zinc Oxide | 3 | 3 | 3 |
| Accelerator | 1 | 1 | 1 |
| Sulfur | 3 | 3 | 3 |
| EPC Black | 50 | 50 | 50 |
| Wax | 3 | 3 | 3 |
| N,N-Dibutyl-N'-hydroxyhexyl-p-phenylenediamine | | 2 | |
| N-Hydroxyhexyl-N'-ethyl-o-phenylenediamine | | | 2 |
| Total | 167 | 169 | 169 |

Normal Properties (Cured 60 min. at 280° F.)

| | | | |
|---|---|---|---|
| 400% Modulus | 3,100 | 2,400 | 3,750 |
| Tensile Strength | 4,025 | 3,750 | 3,800 |
| Elongation | 480 | 520 | 410 |

Aged 2 Days at 212° F.

| | | | |
|---|---|---|---|
| Tensile Strength | 1,900 | 2,025 | 2,100 |
| Elongation | 270 | 320 | 340 |

Ozone Cracking (Artificial Weathering)

| | | | |
|---|---|---|---|
| Dynamic: | | | |
| Size | Severe | Moderate | Moderate. |
| Frequency | Numerous | Numerous | Numerous |

The above phenylenediamine derivatives reduced the ozone cracking from severe to moderate under dynamic conditions. The isomer, N-hydroxyhexyl-N'-ethyl-p-phenylenediamine, is fully equivalent to the ortho phenylenediamine derivative for which test results are given above.

Formulae

| | | |
|---|---|---|
| Smoked Sheet | 100 | 100 |
| Softener | 4 | 4 |
| Stearic Acid | 3 | 3 |
| Zinc Oxide | 3 | 3 |
| Accelerator | 1 | 1 |
| Sulfur | 3 | 3 |
| EPC Black | 50 | 50 |
| Wax | 3 | 3 |
| N-Hydroxyhexyl-N',N'-dimethyl-p-phenylenediamine | ------- | 2 |
| Total | 167 | 169 |

Normal Properties (Cured 60 min. at 280° F.)

| | | |
|---|---|---|
| 400% Modulus | 3,000 | 2,600 |
| Tensile Strength | 4,150 | 3,825 |
| Elongation | 480 | 520 |

Aged 2 Days at 212° F.

| | | |
|---|---|---|
| Tensile Strength | 2,075 | 1,950 |
| Elongation | 270 | 290 |

Ozone Cracking (Artificial Weathering)

| | | |
|---|---|---|
| Static—Dynamic: | | |
| Size | Slight | None |
| Frequency | Numerous | |

The N-hydroxyhexyl-N',N'-dimethyl-p-phenylenediamine is here shown to have repressed completely the formation of ozone cracks in a combined static-dynamic exposure.

By sulfur-vulcanization is meant the curing of rubber by reaction with either free sulfur or a vulcanizing agent of the sulfur-donor type. Known agents of the latter type include the various phenol polysulfides including the alkyl derivatives thereof, the xanthogen polysulfides, the thiuram disulfides and polysulfides, various amine sulfides including the dialkylamine polysulfides and reaction products of primary amines with excess sulfur. Known vulcanization accelerators are useful in speeding up the vulcanization process and operative herein, especially the relatively active accelerators including the thiazole sulfenamides, e.g., N-cyclohexyl-2-benzothiazole-sulfenamide, thiazoline sulfenamides, thiocarbamyl sulfenamides, mercaptothiazoles, mercaptothiazolines, thiazolyl mono- and di-sulfides, the N,N-disubstituted dithiocarbamates, the thiuram sulfides, the xanthogen sulfides, and metallic salts of mercaptothiazoles or mercaptothiazolines or dithiocarbamic acids.

One or more accelerator activators is often used with any of the accelerators mentioned, and such activators include the various derivatives of guanidine known in the rubber art, amine salts of inorganic and organic acids, various amines themselves, and alkaline salts such as sodium acetate and the like, as well as other activators known in the art. Additionally, two or more accelerators or accelerator combinations are sometimes desirable in a single rubber compound. Many of the accelerators mentioned above are suitable in latex formulations, especially such common accelerators as piperidinium pentamethylene dithiocarbamate, zinc butylxanthate, zinc ethylxanthate, zinc salt of mercaptobenzothiazole, zinc dimethyldithiocarbamate, and zinc dibutyldithiocarbamate. Although vulcanization is usually accomplished by heating a vulcanizable rubber composition at a temperature in the range of 240 to 400° F. for a time ranging from several hours to a few seconds, vulcanization does take place at lower temperatures such as ordinary room temperature. It is quite common to vulcanize a latex film containing an ultra-accelerator by allowing the film to remain at room temperature for several hours or a few days.

What I claim is:

1. A sulfur-vulcanized hydrocarbon-diene rubber composition which contains a compound from the class consisting of the N,N'-di(hydroxyalkyl)-p- and o-phenylenediamines in which the alkyl groups each contain 1 to 20 carbon atoms.

2. A sulfur-vulcanized hydrocarbon-diene rubber composition which contains N,N'-di(hydroxyhexyl)-p-phenylenediamine.

3. A compound from the class consisting of the N,N'-di(hydroxyalkyl)-p- and o-phenylenediamines in which the alkyl groups each contain 1 to 20 carbon atoms.

4. N,N'-di(hydroxyhexyl)-p-phenylenediamine.

References Cited in the file of this patent

UNITED STATES PATENTS

| | | |
|---|---|---|
| 1,673,801 | Chute | June 19, 1928 |
| 1,906,939 | Ter Horst | May 3, 1933 |
| 1,980,102 | Semon | Nov. 6, 1934 |
| 2,022,245 | Lehmann | Nov. 26, 1935 |
| 2,348,842 | Paul | May 16, 1944 |
| 2,687,431 | Marschall | Aug. 24, 1954 |

FOREIGN PATENTS

| | | |
|---|---|---|
| 837,635 | France | Feb. 15, 1939 |
| 642,422 | Great Britain | Sept. 6, 1950 |